US008105484B2

(12) United States Patent
Malgorn et al.

(10) Patent No.: US 8,105,484 B2
(45) Date of Patent: Jan. 31, 2012

(54) FLUID STORAGE DEVICE AND ASSOCIATED SYSTEMS AND METHODS

(75) Inventors: Gerard Malgorn, Quimper (FR);
Arnaud Le Ven, Ergue Gaberic (FR);
Emmanuel Page, Tremeoc (FR);
Jean-Yves Picard, Quimper (FR); J. Bruce Schelkopf, Zionsville, IN (US);
Barry Verdegan, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 630 days.

(21) Appl. No.: 12/339,907

(22) Filed: Dec. 19, 2008

(65) Prior Publication Data
US 2010/0154727 A1 Jun. 24, 2010

(51) Int. Cl.
*F02M 37/22* (2006.01)
*B01D 17/02* (2006.01)

(52) U.S. Cl. .................. 210/114; 210/172.1; 210/257.2; 220/4.14; 220/495.08

(58) Field of Classification Search ... 123/2; 210/257.1, 210/172.1, 532.1, 532.2, 112, 114; 220/4.14, 220/495.01, 495.06, 495.08
See application file for complete search history.

(56) References Cited

U.S. PATENT DOCUMENTS 3,249,229 A * 5/1966 Kasten ..................... 210/195.1
6,361,684 B1 3/2002 Hawkins et al.
7,316,774 B2 * 1/2008 Halemba et al. ............. 210/110
2005/0121374 A1 * 6/2005 Girondi ........................ 210/97
2006/0086649 A1 4/2006 Wieczorek et al.
2007/0039865 A1 2/2007 Jiang et al.

FOREIGN PATENT DOCUMENTS

| JP | 2002-070680 | 3/2002 |
| JP | 2004-074991 | 3/2004 |
| KR | 10-0216794 | 9/1999 |
| WO | 98/48164 | 10/1998 |

OTHER PUBLICATIONS

International Search Report of Application No. PCT/US2009/068219, dated Jul. 30, 2010, 3 pages.
Written Opinion of Application No. PCT/US2009/068219, dated Jul. 30, 2010, 5 pages.

* cited by examiner

*Primary Examiner* — Terry Cecil
(74) *Attorney, Agent, or Firm* — Hamre, Schumann, Mueller & Larson, P.C.

(57) ABSTRACT

According to one representative embodiment, a fluid storage device for storing a first fluid in a second fluid storage container fillable with a second fluid includes a first fluid storage container, a first fluid inlet coupled to the first fluid storage container, and a first fluid outlet coupled to the first fluid storage container. The first fluid storage container is flexible. The first fluid inlet is communicable in fluid receiving communication with a first fluid source. The first fluid in the first fluid storage container is caused to drain from the first fluid outlet based on at least one of a first fluid level, a first fluid storage container pressure, a second fluid storage container pressure, the second fluid storage container filling with the second fluid, the first fluid outlet being opened for first fluid egress, and a first fluid outlet pressure.

22 Claims, 12 Drawing Sheets

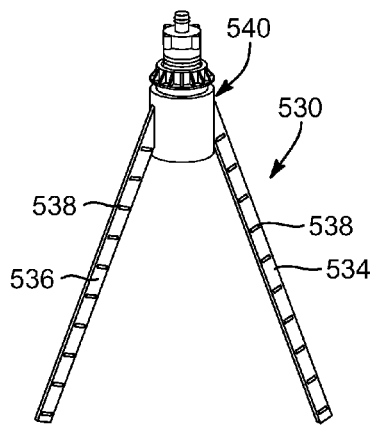
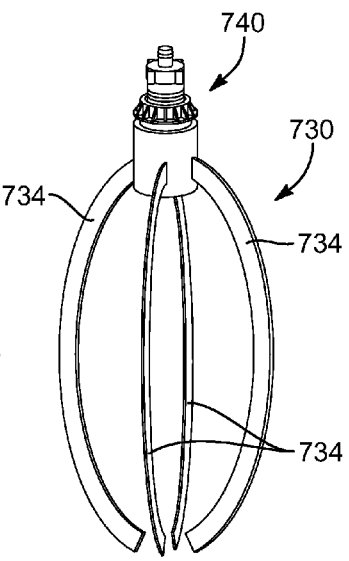
FIG. 12A  FIG. 12B  FIG. 12C
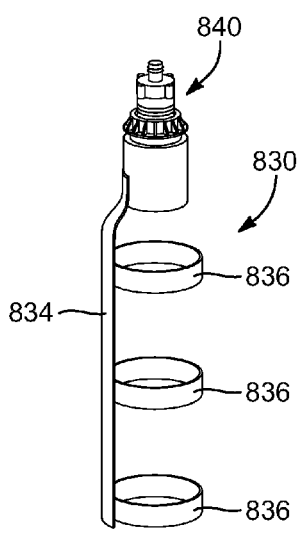
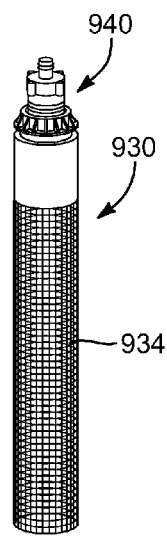
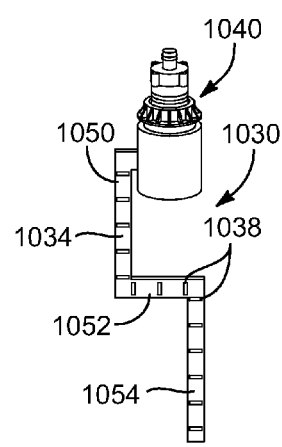
FIG. 12D  FIG. 12E  FIG. 12F ional combustion engine. Typically, sedimentation chambers and water storage containers for collecting water separated from a fuel stream are rigid and thus may crack or otherwise become structurally unsound as the collected water freezes.

FLUID STORAGE DEVICE AND ASSOCIATED SYSTEMS AND METHODS

FIELD

This invention relates to a fluid storage system for managing a first fluid separated from a second fluid, and more particularly to a fluid storage device for receiving, storing, and removing the first fluid.

BACKGROUND

Hydrocarbon-based liquid fuels, such as diesel fuel, frequently include quantities of water. The water may be emulsified in the fuel in the form of water droplets. Internal combustion engines such as diesel engines typically require separation of the water from the fuel before combusting the fuel. A fuel water separator ("FWS") or a fuel water coalescer may be used to separate the free and emulsified water from the fuel. Separating the water from the fuel improves and enhances the performance of the engine by reducing corrosion and erosion.

In conventional FWS systems, after being separated from the fuel, the stripped water droplets are collected in a storage area and drained. In some systems, the FWS may include a sedimentation chamber at its base for collecting the water. The water is then drained from the sedimentation chamber into the environment through a drain port. In other FWS systems, the collected water in the sedimentation chamber is drained into a dedicated water storage container, or in an FWS without a sedimentation chamber, the separated water is collected directly in a dedicated water storage container. The water collected in the storage container is then drained into the environment or into a separate vessel for storage, treatment, and/or reuse.

Whether separated water is collected in a sedimentation chamber, water storage container, or both, the water must be manually or automatically drained. Manually draining the separated water by end-users of the FWS system can be difficult and time-consuming. Further, whether manually or automatically drained, the water level must be continuously monitored and regulated, which requires additional and expensive control system components and software.

Many FWS systems do not include hydrocarbon filters for filtering environmentally dangerous hydrocarbons that may be present in the separated water. Accordingly, even if a FWS system provided for automatically draining separated water to reduce manual interaction with the FWS system, the drained water may include undesirable hydrocarbons.

Operatively, some FWS systems may not have sufficient water storage capacity, such as, for example, when fuel has an unusually high concentration of water. For example, FWS systems employing a sedimentation chamber as the sole water storage device may not be large enough to store an adequate amount of separated water. Similarly, FWS systems including a separate and dedicated water storage container may be too small to provide for adequate storage as FWS systems often are designed to preserve space for other related or unrelated system components. Consequently, an insufficient separated water storage capacity may lead to frequent drainage of the separated water often at undesirable times. To increase water storage capacity, certain conventional FWS systems utilize large, stand-alone water storage containers. Such large tanks, however, are not desirable and occupy valuable space within an internal combustion engine system that could be used for other engine system components.

Further, conventional sedimentation chambers or water storage containers for collecting separated water typically do not account for volume change stresses associated with freezing water. In cold weather applications, the ambient temperature may be sufficiently low to freeze collected water during non-operating and even operation of the internal combustion engine. Typically, sedimentation chambers and water storage containers for collecting water separated from a fuel stream are rigid and thus may crack or otherwise become structurally unsound as the collected water freezes.

SUMMARY

The subject matter of the present application has been developed in response to the present state of the art, and in particular, in response to the problems and needs in the art that have not yet been fully solved by currently available FWS systems and other fluid storage systems. Accordingly, the subject matter of the present application has been developed to provide a fluid management system, and associated systems and methods, having a fluid storage device for storing a first fluid, e.g., water, separated from a second fluid, e.g., a fuel stream, that overcomes at least some shortcomings of the prior art FWS and other fluid systems. For example, described herein are embodiments of a fluid management system with a fluid storage device that may not require continuous monitoring, may have an adequate water storage capacity, may remove harmful or undesirable contaminants from the separated water, may minimize occupied space within the associated engine system, and/or may account for volume change stresses associated with freezing water.

According to one representative embodiment, a fluid storage device for storing a first fluid in a second fluid storage container fillable with a second fluid includes a first fluid storage container, a first fluid inlet coupled to the first fluid storage container, and a first fluid outlet coupled to the first fluid storage container. The first fluid storage container is flexible. The first fluid inlet is communicable in fluid receiving communication with a first fluid source. The first fluid in the first fluid storage container is caused to drain from the first fluid outlet upon the occurrence of one or more of (i) the first fluid storage container filling with the first fluid to a predetermined level; (ii) the first fluid storage container having a pressure less than a pressure of the second fluid storage container; (iii) the first fluid storage container pressure achieving a predetermined threshold; (iv) the second fluid storage container pressure achieving a predetermined threshold; (v) the second fluid storage container filling with the second fluid; (vi) the first fluid outlet being opened for first fluid egress; and (vii) the first fluid storage container having a pressure greater than pressure in the first fluid outlet.

In one implementation, a fluid storage device includes a fluid flow regulator coupled to the first fluid outlet of the first fluid container. The fluid flow regulator opens to allow first fluid contained within the first fluid storage container to exit or drain from the first fluid storage container through the first fluid outlet in response to the pressure within the second fluid storage container reaching a predetermined pressure threshold. In another implementation, a fluid flow regulator allows fluid in the first fluid storage container to exit the first fluid storage container under the force of gravity regardless of the second fluid level in the second fluid storage container. The fluid flow regulator can be any of various devices, such as, for example, a pressure relief valve, a manually operated fluid valve, a hydraulically activated valve, and an electronically controlled fluid valve, configured to drain fluid from the bladder when the pressure of the fluid near the regulator reaches a threshold pressure.

In some implementations, the fluid storage device also includes a water drainage assembly coupled to the first fluid storage container and securable to the second fluid storage container. The inlet and outlet can be coupled to the water drainage assembly. In certain implementations, the fluid storage device includes a first fluid intake assembly and a first fluid drainage assembly spaced-apart from the first fluid intake assembly. The first fluid intake assembly and first fluid drainage assembly are coupled to the first fluid storage container and securable to the second fluid storage container. The first fluid inlet is coupled to the first fluid intake assembly and the first fluid outlet is coupled to the first fluid drainage assembly.

According to some implementations, the first fluid storage container is flexible, e.g., resiliently flexible. In yet some implementations, the first fluid storage container includes an expandable bladder. Further, in certain implementations, the first fluid storage container also includes at least one flexible bellows.

In some implementations, the first fluid storage container includes two opposing walls and the fluid storage device further includes a wall spacer positioned within the first fluid storage container between the opposing walls. The wall spacer can include at least one elongate at least partially rigid member. A plurality of arms may extend away from the rigid member. In certain implementations, the wall spacer includes at least two elongate at least partially rigid members. The at least two at least partially rigid members may extend substantially parallel to each other. Alternatively, the at least two at least partially rigid members can extend at an angle relative to each other. In specific implementations, the at least one at least partially rigid member can be substantially arcuate. In certain configurations, the at least one at least partially rigid member can be substantially helical. In other configurations, the wall spacer includes a meshed portion, such as an at least partially curved mesh sheet.

According to another embodiment, a water containment and removal system for an internal combustion engine powered by a fuel includes a fuel tank fillable with fuel. The fuel tank is communicable in fuel supplying communication with the internal combustion engine via a fuel supply line. The system also includes a fuel-water separator coupled to the fuel supply line where the fuel-water separator is configured to separate water from fuel in the fuel supply line. Further, the system includes a water storage container positioned within the fuel tank where the water storage container is communicable in water receiving communication with the fuel-water separator via a water supply line. The system additionally includes a water drainage line coupled to the water storage container.

In some implementations, the water storage container is flexible. Fuel present in the fuel tank can compress the flexible water storage container to urge water in the water storage container out of the water storage container via the water drainage line. In yet some implementations, as the fuel tank fills with fuel, a pressure of the fuel against the water storage container increases to urge water in the water storage container to drain from the tank through the water drainage line. According to some implementations, the water drainage line includes a fluid flow valve configured to open to allow water to drain from the water storage container in response to fuel in the fuel tank increasing a pressure of water in the water storage container above a threshold value.

According to certain implementations, the water storage container is fillable with water from the fuel-water separator and fuel in the fuel tank causes water in the water storage container to drain from the water storage container via the water drainage line. The amount of water drained from the water storage container may correspond with an amount of fuel within the fuel tank, or an amount of fuel within the tank over a period of time. Water can be drained from the water storage container when a percentage of the fuel tank filled with fuel is above a desired threshold. In other implementations, water collected from fuel over a period of time may be removed from the water storage container at a predetermined collection time or predetermined collection amount. The collected water may be removed manually, automatically, gravitationally, or with the assistance of a computer-enabled or logic-controlled device.

In some implementations, the system further includes a water backflow regulator coupled to the water supply line between the fuel-water separator and the water storage container. In certain configurations, the system also includes a fluid flow regulating valve coupled to the water drainage line. Additionally, the system can include a hydrocarbon removal device, such as a hydrocarbon absorber or adsorber, coupled to the water drainage line.

The water storage container can be horizontally oriented within the fuel tank in some implementations. In certain implementations, the water storage container is vertically oriented within the fuel tank. In yet some implementations, the fuel tank includes a bottom wall with the water storage container being mounted to the bottom wall. The fuel tank can include a side wall and the water storage container can be mounted to the side wall. Further, in certain instances, the fuel tank includes a top wall, bottom wall, and opposing side walls extending between the top and bottom walls and the water storage container can be mounted to the top and bottom walls and positioned between the opposing side walls.

In yet another embodiment, a method for containing and removing a fluid from an internal combustion engine includes filling a first flexible fluid container with a first fluid via an inlet coupled to the first flexible fluid container. The first fluid container is positioned within a second fluid container. The method also includes filling the second fluid container with a second fluid. Additionally, the method includes at least one of (i) applying pressure to the first flexible fluid container using the second fluid within the second fluid container to force the first fluid out of the first fluid container via an outlet coupled to the first flexible fluid container; (ii) removing pressure from the outlet coupled to the first flexible fluid container to release the first fluid out of the first fluid container; and (iii) applying pressure from the second fluid container onto the first fluid container above a predetermined threshold.

In certain implementations, the method includes preventing the first fluid from being forced out of the first fluid container until the applied pressure reaches a threshold level. The threshold level can correspond with a desired second fluid volume to second fluid container volume ratio.

In another embodiment, a method for containing and removing water from an internal combustion engine powered by a fuel supplied from a fuel tank via fuel supply line includes separating water from the fuel in the fuel supply line and collecting the separated water in a flexible water bladder enclosed within the fuel tank. The method also includes preventing separated water in the flexible water bladder from draining out of the flexible water bladder for fuel levels in the fuel tank below a threshold value and draining separated water from the flexible water bladder for fuel levels in the fuel tank above the threshold value. Draining the separated water can include draining separated water into the environment.

In some implementations of the method, draining separated water from the flexible water bladder includes compressing the flexible water bladder with fuel in the fuel tank to force water out of the flexible water bladder.

The method can also include regulating a backflow of separated water from the flexible water bladder. Further, the method can include opening a fluid drain valve when the fuel level in the fuel tank is above the threshold value. In certain implementations, the method includes removing hydrocarbons from the drained separated water.

In yet another embodiment, a fluid storage device for storing a first fluid in a second fluid storage container fillable with a second fluid includes a first fluid storage container that has a volume defined by one or more flexible walls sealed and arranged within the second fluid storage container. The first fluid storage container is flexible and at least one of the one or more flexible walls is compressively responsive to pressure exerted on the at least one of the one or more flexible walls by the second fluid. Additionally, at least one of the one or more flexible walls is tensionably expansive to pressure exerted on the at least one of the one or more flexible walls by the first fluid. The fluid storage device also includes a first fluid inlet coupled to the first fluid storage container, where the inlet is communicable in fluid receiving communication with a first fluid source, and a first fluid outlet coupled to the first fluid storage container. The first fluid in the first fluid storage container is caused to drain from the first fluid outlet upon the occurrence of one or more of: (i) the first fluid storage container filling with the first fluid to a predetermined level; (ii) the first fluid storage container having a pressure less than a pressure of the second fluid storage container; (iii) the first fluid storage container pressure achieving a predetermined threshold; (iv) the second fluid storage container pressure achieving a predetermined threshold; (v) the second fluid storage container filling with the second fluid; (vi) the first fluid outlet being opened for first fluid egress; and (vii) the first fluid storage container having a pressure greater than pressure in the first fluid outlet.

Reference throughout this specification to features, advantages, or similar language does not imply that all of the features and advantages that may be realized with the present invention should be or are in any single embodiment or implementation of the invention. Rather, language referring to the features and advantages is understood to mean that a specific feature, advantage, or characteristic described in connection with an embodiment is included in at least one embodiment of the present invention. Discussion of the features and advantages, and similar language, throughout this specification may, but do not necessarily, refer to the same embodiment or implementation.

The described features, advantages, and characteristics of the invention may be combined in any suitable manner in one or more embodiments and/or implementations. One skilled in the relevant art will recognize that the invention may be practiced without one or more of the specific features or advantages of a particular embodiment or implementation. In other instances, additional features and advantages may be recognized in certain embodiments and/or implementations that may not be present in all embodiments or implementations of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIGS. 12A-12F each show a respective further embodiment of a water storage container wall spacer.

DETAILED DESCRIPTION

Figure 1:
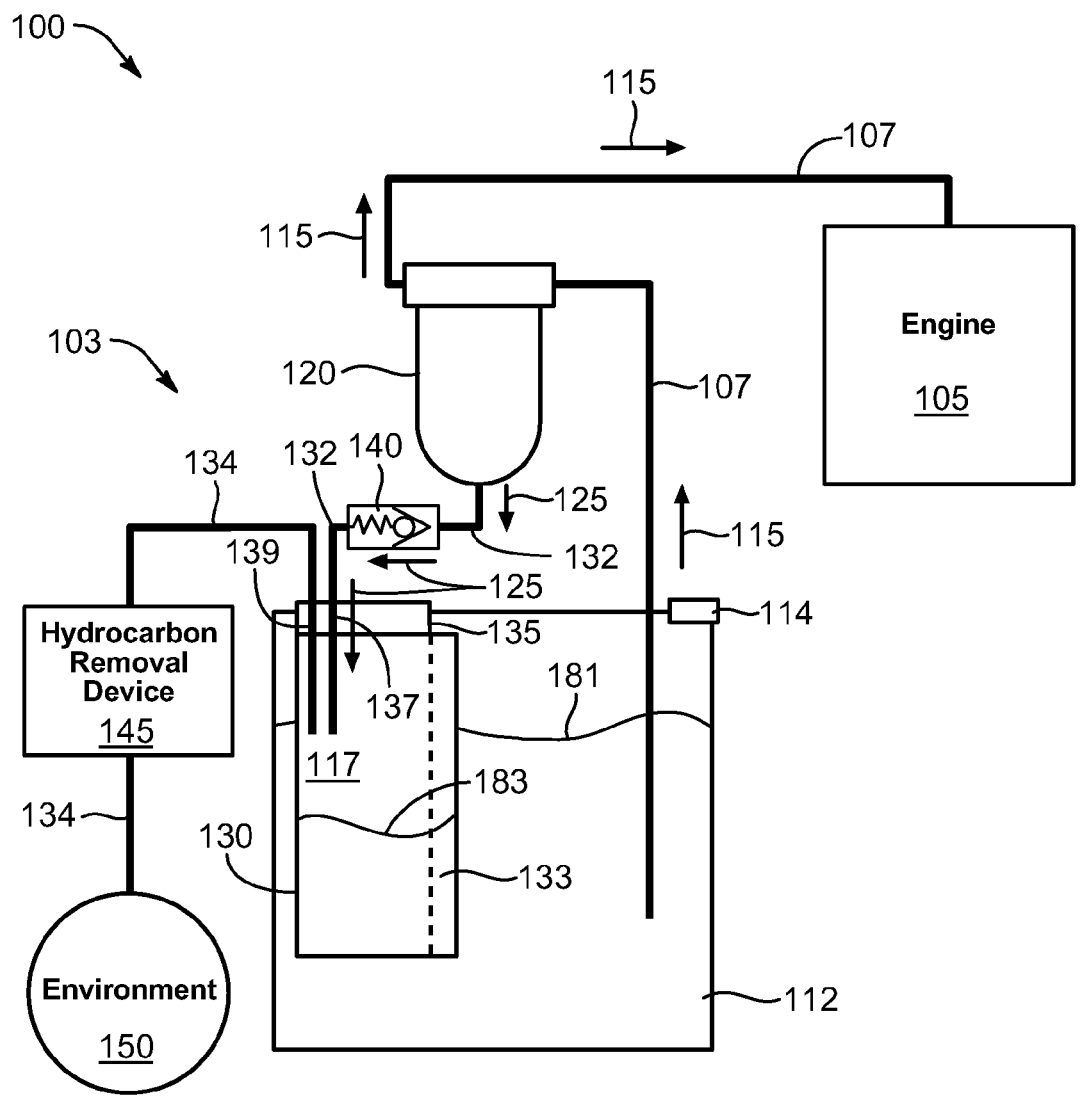
FIG. 1 is a schematic diagram of an internal combustion engine system having a water storage container housed within a fuel tank according to an embodiment.

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present invention, however, absent an express correlation to indicate otherwise, an implementation may be associated with one or more embodiments.

The described features, structures, or characteristics of the invention may be combined in any suitable manner in one or more embodiments. In the following description, numerous specific details are provided to impart a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Described herein are various embodiments of a fluid storage device, and associated systems and methods, for storing and draining a fluid in an internal combustion engine system. Generally, in certain embodiments, the fluid storage device includes a flexible container (e.g., bladder, bellows, and tank) positioned within a consumable fluid container (e.g., fuel tank). Over time, the consumable fluid container empties as a consumable fluid (e.g., fuel) in the consumable fluid container is consumed. Over time, another fluid (e.g., water) removed from the consumable fluid is collected in the flexible container. The collection of the fluid removed from the consumable fluid may be simultaneous with the consumption of the consumable fluid in the consumable fluid container, though the present invention is not necessarily so restricted. When the consumable fluid container is refilled with consumable fluid, the flexible container empties at least some collected fluid when the pressure of the added consumable fluid on the flexible container causes the collected fluid in the flexible container to exit, e.g., drain from, the flexible container. In some implementations, the pressure from the consumable fluid can cause the first fluid to exit the first flexible container if gravity is not sufficient. The above certain embodiments can, among other advantages, increase water storage capacity, eliminate a need for continuous monitoring of the first fluid levels, accommodate expansion and contraction of the flexible container due to changes in the properties of the fluid, reduce space occupied by the flexible container, make available space within the internal combustion engine for other components, and eliminate the need for manual draining of the first fluid.

Figure 2:
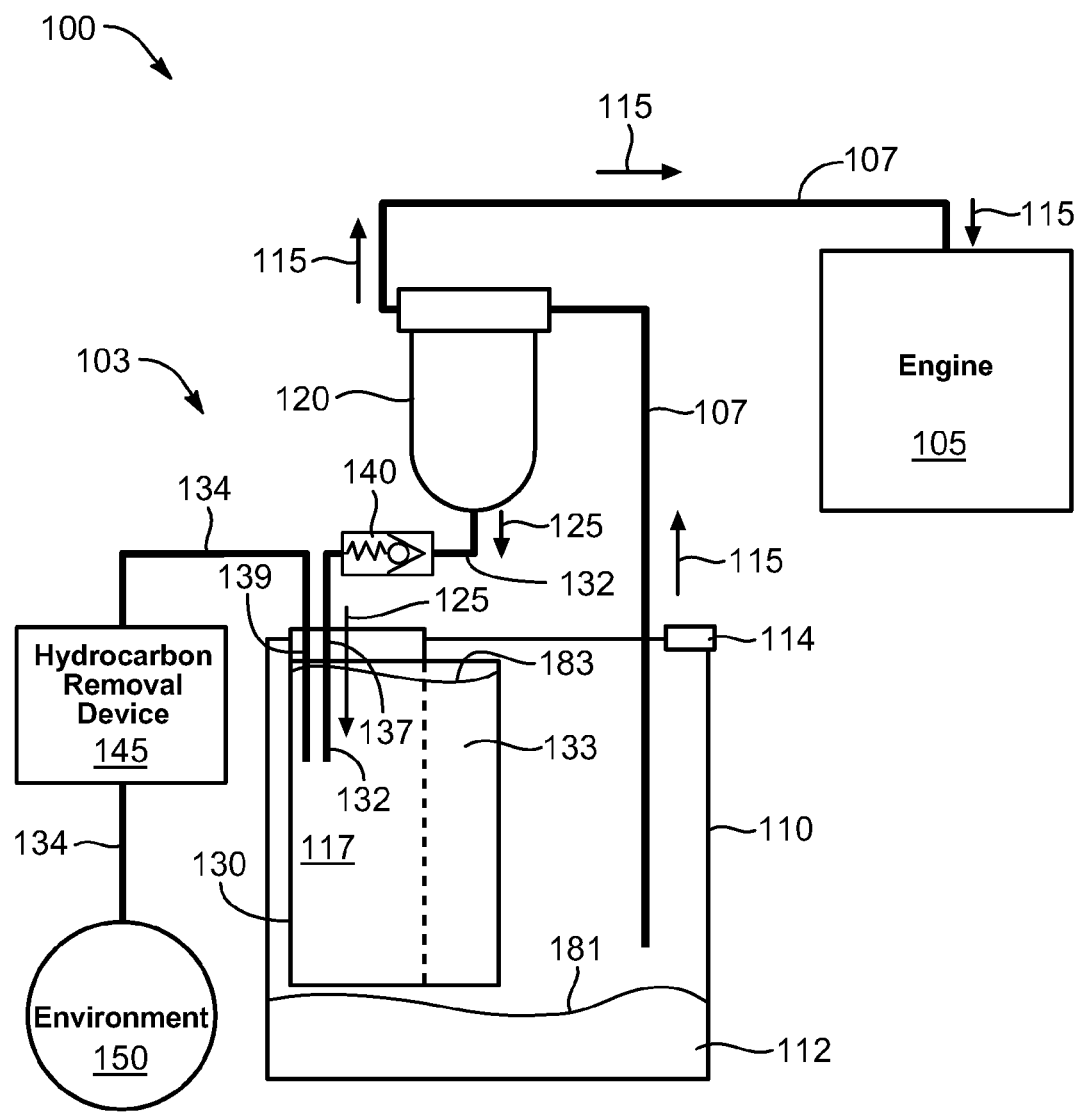
FIG. 2 is a schematic diagram of the internal combustion engine system of FIG. 1 shown with a low fuel level in the fuel tank and a high water level in the water storage container in accordance with another embodiment.
Figure 3:
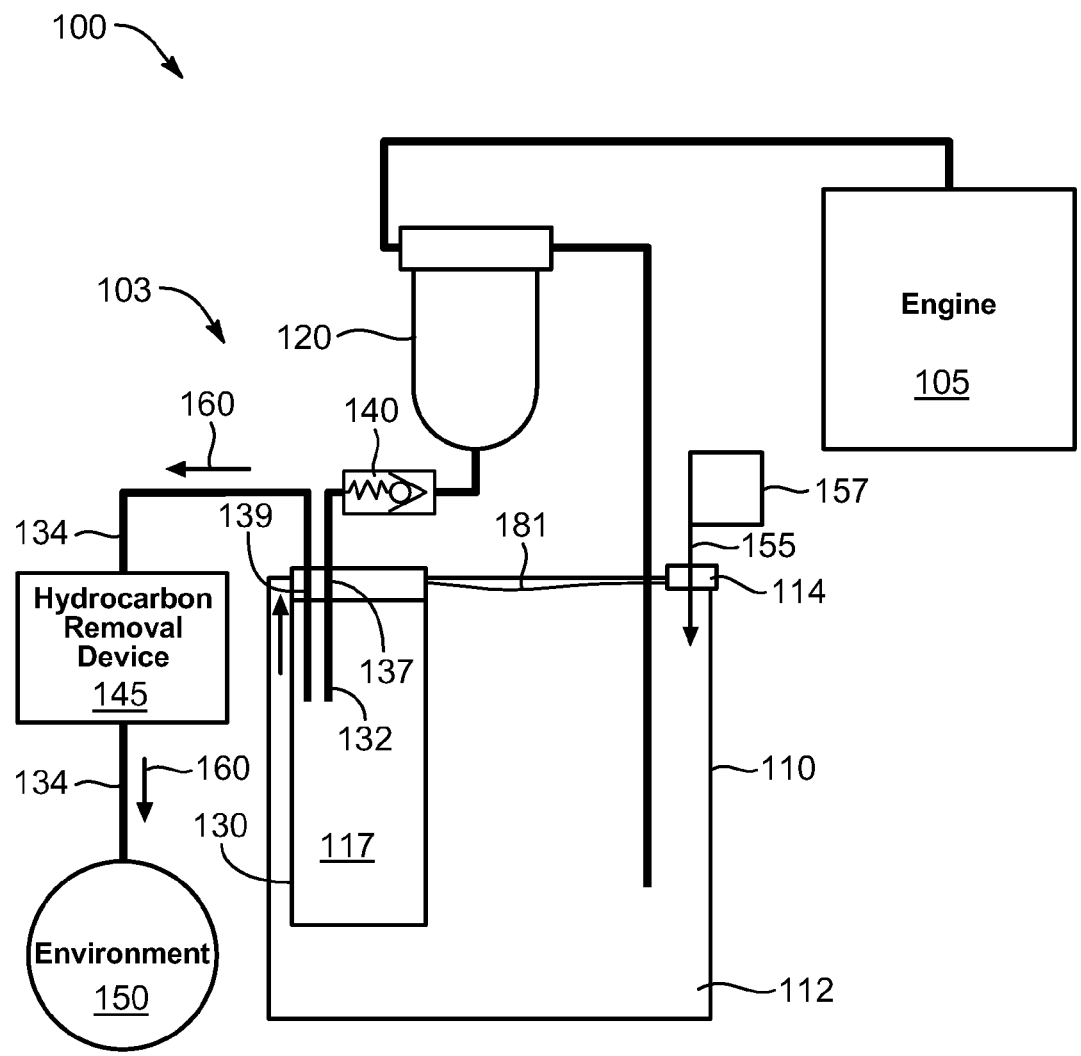
FIG. 3 is a schematic diagram of the internal combustion engine system of FIG. 1 shown just after a refueling and water draining event in accordance with another embodiment.

According to one representative embodiment, a water storage and drainage system 100 is shown in FIGS. 1-3. The system 100 includes an internal combustion engine 105 coupled to a fuel tank 110. The engine 105 is powered by fuel 112 contained within the fuel tank 110. Fuel can be added to the fuel tank 110, e.g., the fuel tank can be refueled during a refueling event, through a fuel inlet or fuel fill port 114. The fuel 112 is supplied to the engine 105 in a fuel flow direction indicated by directional arrows 115 via a fuel supply line 107 extending from the fuel tank 110 to the engine 105. The system 100 further includes a water containment and removal system 103 having a fuel-water separator (FWS) 120, coalescer, centrifuge, or other device for separating water from fuel coupled to the fuel supply line 107.

During operation of engine 105, fuel 112 passes through the FWS 120 prior to being injected into the engine. As fuel 112 passes through the FWS 120, the FWS separates water from the fuel and collects the separated water at the base of the FWS, or alternatively, the separated water is not collected in the FWS. The FWS 120 includes an outlet port (not shown) through which separated or collected water can be drained. The outlet port can include a valve (e.g., a check valve, automatic drain valve, or other type of valve) closable to prevent separated or collected water from draining out of the FWS or openable to allow collected water to drain out of the FWS. The valve can be operable manually by user input or action, controlled automatically by an electronic control unit, controlled automatically by a float valve, and/or controlled automatically by capillary pressure techniques. The FWS 120 can be any of various FWS devices known in the art, such as those described in U.S. application Ser. No, 10/973,523, filed Oct. 26, 2004, U.S. application Ser. No. 11/204,302, filed Aug. 15, 2005 and U.S. Pat. No. 6,361,684, issued Mar. 26, 2002, each of which are incorporated herein by reference.

The system 100 also includes a fluid storage device that comprises a water storage container or tank 130 positioned within the fuel tank 110 and a water drainage assembly 135 coupled to the water storage container. The water storage container 130 is coupled to the FWS 120 in water receiving communication with the FWS and coupled to the fuel tank 110 by the water drainage assembly 135, which is secured to a wall of the fuel tank. The water drainage assembly 135 includes a water inlet and outlet 137, 139, respectively. The water storage container 130 is made from a flexible material, such as rubber or Kevlar®. In some implementations, the material is resiliently flexible, collapsible, or stretchable such that the water storage container 130 is expandable and contractible. In some implementations, the water storage container 130 is expandable between an unflexed or unbiased state defining a water storage cavity 117 having a minimum volume (as shown in FIG. 3) to a fully flexed or fully expanded state (as shown in FIG. 2) where the water storage cavity has a maximum volume (as shown in FIG. 2).

As will be discussed in more detail below, the water storage container 130 can be volumetrically adjustable to receive and discharge water in a predetermined manner. Generally, the water storage container 130 can be configured to change shape or size to adjust the volumetric capacity of the tank, and have a constant (non-stretchable) or variable (stretchable) internal surface area. For example, the water storage container 130 can be a flexible and stretchable bladder having an adjustable volume and an adjustable or variable internal surface area. Alternatively, the water storage container 130 is a bellows-type device that is flexible, but not stretchable. The bellows-type device has a constant internal surface area, but can at least partially collapse upon itself to adjust the internal volume of the device. In some instances, the water storage container 130 includes a flexible bladder having any of various shapes oriented in any of various orientations as will be discussed in more detail below.

Further, in certain embodiments, a water storage and drainage system may include a flexible segregating wall positioned within a fuel tank. The flexible segregating wall separates the fuel tank into a fuel storage portion and a separated water collection and storage portion (i.e., a water storage container). The flexible segregating wall may be sealingly secured to the walls of the fuel tank such that fuel in the fuel storage portion does not mix with collected water in the separated water collection and storage portion and vice versa. In some implementations, the flexible segregating wall is stretchable or resiliently flexible such that the separated water collection and storage portion is at least partially expandable and contractible to respectively increase and reduce the volume of the separated water collection and storage portion. The flexible segregating wall may be formed of a flexible material, such as rubber and/or Kevlar®, and in some instances, comprises a flexible membrane. In alternative implementations, portions of the flexible segregating wall may be formed of an at least partially rigid material such that a minimum internal volume of the separated water collection and storage portion is maintained in a predetermined manner.

The inlet 137 is in fluid communication with a water supply line 132 extending between the FWS 120 and the water storage container 130. Separated water 133 collected in the FWS 120 is flowable through the water supply line 132 in a direction indicated by directional arrows 125 from the FWS 120, through the inlet 137, and into the water storage container 130. The system 100 includes a water backflow control valve 140 coupled to the water supply line 132. The control valve 140 is a one way valve allowing water flow through the valve 140 in the water flow direction 125, but preventing water flow through the valve in a direction opposite the water flow direction 125. Generally, the control valve 140 prevents water from flowing back into the FWS 120 and fuel supply line 107.

The outlet 139 of the water drainage assembly 135 is in fluid communication with a water drain line 134 extending between the water storage container 130 and the environment 150. As used herein, the environment 150 is defined broadly to include any of various locations, media, devices, and systems, such as the atmosphere, water treatment devices or systems, and/or water reuse devices or systems. Separated water 133 contained in the water storage container 130 is flowable through the water drain line 134 in a direction indicated by directional arrows 160 (see FIG. 3) from the water storage container, through the outlet 139, and into the environment 150. The system 100 may include a hydrocarbon removal device 145 coupled to the water drain line 134 between the water storage container 130 and the environment 150. Alternatively, the hydrocarbon removal device 145 can be positioned upstream of the water storage container 130. The hydrocarbon removal device 145 can be any of various hydrocarbon removal devices configured to absorb, adsorb, or otherwise remove hydrocarbons from a fluid source (e.g., water). For example, the hydrocarbon removal device 145 can include a hydrocarbon absorber or hydrocarbon adsorber having a hydrocarbon removing medium (e.g., catalyst bed) made from any of various materials known in the art, such as activated carbon, zeolite, charcoal, alumina, and precious metals. In implementations where the hydrocarbon removal device 145 is an absorber, the device 145 can remove hydrocarbons in the separated water via known absorption techniques. Alternatively, in implementations where the hydrocarbon removal device 145 is an adsorber, the device 145 can remove hydrocarbons in the separated water via known adsorption techniques.

As separated water 133 is drained from the water storage container 130, it passes through the hydrocarbon removal device 145, which removes or reduces the quantity of hydrocarbons remaining in the separated water before the water is expelled, e.g., drained, evaporated, hydrolyzed, or otherwise removed, into the environment 150. In certain implementations, the system 100 can include a fuel return line (not shown) fluidly coupling the hydrocarbon removal device 145 and the fuel tank. The fuel return line is configured to facilitate the flow of unabsorbed hydrocarbons back to the fuel tank.

Although not shown, the outlet 139 can include a fluid flow regulating device, such as a pressure relief valve, electronically controlled valve, and manually operated valve, that prevents water 133 from exiting the water storage container 130 through the water drain line 134 if the pressure of water within the water storage container is below a threshold value. The threshold value of the fluid flow regulating valve can be selected as desired based on any of various factors, such as operating conditions of the engine, refueling frequency, and refueling quantity. Alternatively, the outlet 139 does not include a fluid flow regulating device, and accumulated water in the tank is removed at each fuel refill.

As shown in FIG. 1, during operation of the internal combustion engine 105, fuel 112 continuously flows from the fuel tank 110 into the engine via the fuel supply line 107 as indicated by directional arrows 107. Accordingly, operation of the engine 105 causes the volume or fuel level 181 of fuel 112 within the fuel tank 110 to decrease (see FIG. 2). The amount of fuel 112 within the fuel tank 110 can be represented as a percent full index (i.e., the percentage of the fuel tank volume occupied by fuel) or a fuel ratio (i.e., the ratio of the volume of fuel within the fuel tank to the volume of the fuel tank.) The hydrostatic pressure of the fuel in the fuel tank is applied to the surfaces of the fuel tank, as well as the water storage container 130. Accordingly, the amount of fuel 112 within the fuel tank 110 can be defined according to the hydrostatic pressure of the fuel. In other words, during operation of the engine, the percent full index, fuel ratio, and hydrostatic pressure of the fuel correspondingly decreases.

As fuel flows through the fuel supply line 107 during operation of the engine 105, the FWS 120 separates and collects water from the fuel flow. The water can be initially collected in the FWS 120 and selectively drained to the water storage container 130 via operation of a valve as discussed above, or drained directly to the water storage container 130 without collecting in the FWS. Either way, separated water 133 is eventually drained from the FWS 120 into the water storage container 130 as indicated by directional arrows 125 in FIG. 1. As the engine 105 operates, the water level 183 in the water storage container 133 increases (see FIG. 2). In this manner, separated water is collected within the fuel tank 110 without contaminating the fuel.

For a flexible and stretchable water storage container 130, the water storage container 130 is expandable from a minimum volume state (see, e.g., FIGS. 1 and 2 (in dashed line) and FIG. 3 (in solid line)) to a maximum volume state (see, e.g., FIG. 2 (in solid line)) and contractable from the maximum volume state to the minimum volume state. In operation, water 133 collected in the water storage container 130 causes the water storage container to expand into any of various intermediate states where the storage cavity 117 has an intermediate volume between the minimum and maximum volumes (see, e.g., FIG. 1 (in solid line)). Without a refueling event, as more water 133 is collected in the water storage container 130, the water storage container will eventually expand from an intermediate volume into the maximum volume state, e.g., a fully expanded state. Preferably, the engine system 100 is configured such that the water storage container 130 will not expand into a fully expanded before a refueling event effects a drainage of water from the tank as is discussed below. Although the illustrated water storage container 130 is depicted as expanding and contracting in a lateral or sideways direction, it is noted that the water storage container 130 can be configured to expand in any direction, such as up, down, and diagonally. For a flexible and non-stretchable water storage container 130, the volume of water in the water storage container can increase as water is collected.

As depicted in FIG. 3, the system 103 is configured to drain water from the water storage container 130 in response to a refueling event. As fuel is added to the fuel tank 110, the hydrostatic pressure of the fuel forces water in the water storage container 130 to drain from the tank such that the water storage container substantially empties of water and returns to the minimum volume state as shown in FIG. 3.

At any point between a full fuel tank 110 (i.e., a fuel ratio equal to approximately one) and an empty fuel tank (i.e., a fuel ratio equal to approximately zero) a refueling event can occur. As shown in FIG. 3, a refueling event is defined as the addition of fuel 155 from a fuel source 157 to the fuel tank 110 via the fuel tank inlet 114. The frequency of and amount of added fuel associated with refueling events can vary depending on any of various factors, such as user preference, operating conditions, terrain, and fuel service station availability. For example, a user may desire to refuel the fuel tank 110 when the fuel ratio is close to zero (see FIG. 2), close to 0.5 (see FIG. 1), nearly 1.0 (see FIG. 3) or any fuel ratio therebetween. Moreover, for a given refueling event, a user may desire to completely fill the fuel tank 110 or only partially fill the fuel tank.

As discussed above, separated water 133 fills the water storage container 130 as the engine is operated over time. Generally, the water storage container 130 is filled during a water filling period and emptied or drained during a water draining period. Because water typically only makes up between about 0.1% and about 1% of the fuel, the water storage container 130 fills up with water 133 at a much slower rate than fuel 112 is consumed by the engine 105. In certain embodiments, each refueling event results in water collected in the water storage container 130 since the previous fueling event to drain from the tank. In other words, as the fuel tank is filled with fuel, the hydrostatic pressure of the fuel is sufficient to force water through the fluid flow device and drain from the water storage container 130 regardless of the amount of water in the water storage container. In other embodiments, however, the water filling period spans several refueling events such that water is not drained from the water storage container 130 during each refueling event. In other words, water collects in the water storage container 130 over a span of two or more refueling events, such as 10, 100, or more, and isn't drained until a combined hydrostatic pressure of the fuel and water reaches a predetermined threshold greater than the hydrostatic pressure of the fuel in a full fuel tank. Once the predetermined threshold is reached, the water flow regulating device coupled to the water drain line 134 is automatically opened, may be logically controlled, or can be manually opened, to allow water in the tank to drain through the water drain line. Preferably, the water is forcibly drained from the water storage container 130 due to the hydrostatic pressure of the fuel, but in some embodiments, gravity can force the water from the water storage container. For example, for water drain lines located toward a bottom of the water storage container (see, e.g., FIGS. 4-11), gravity causes the water pressure at the water drain line to increase as water fills the water storage container. The water drain line can then be configured to open once the water pressure at the water drain line increases to a level that meets or exceeds a predetermined threshold.

In the aforementioned embodiments, the system 100 can be configured such that all or just a portion of the water in the water storage container 130 drains from the tank during a refueling event. The amount of water drained from the water storage container 130 can be dependent upon any of various factors, for example, the size of the fuel tank 110 in relation to the water storage container, the type of fuel being used, and the sensitivity of the water flow regulating device, which in some cases is selectively adjustable. One of ordinary skill in the art in view of this disclosure will be able to determine the proper combination of factors for achieving a desired water drainage amount. Further, removal of all water from a water storage container does not necessarily mean a complete absence of water in the tank and may not be a desired result in all operative uses of the present invention. Rather, as used herein, removal of all water in a water storage container can be achieved even if a small or insignificant amount of residual water remains in the tank. Additionally, although the system in the illustrated embodiments is described as a water removal and storage system for an internal combustion engine system, in other embodiments, the features and advantages of the present invention are applicable to any of various systems in which storage of one fluid separate from another fluid is desirable.

Figure 4:
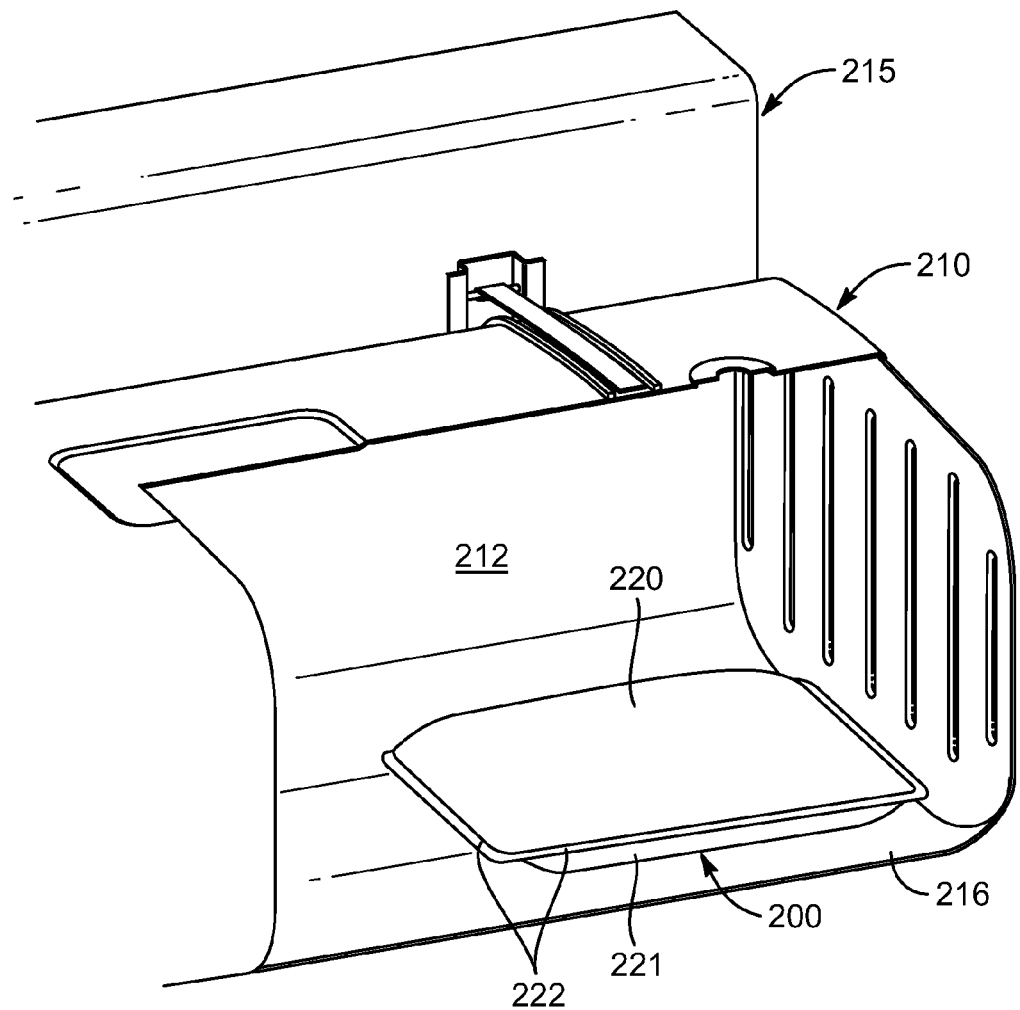
FIG. 4 is a perspective view of a water storage container within a fuel tank shown with a portion of the fuel tank removed in accordance with another embodiment.

According to one embodiment shown in FIG. 4, a fluid storage device includes a water storage container 200 positioned within an interior cavity 212 of a fuel tank 210. The fuel tank 210 is mounted to a portion of a vehicle, such as a side fairing 215. The water storage container 200 is positioned within the tank 210 along a bottom wall 216 of the tank. The water storage container 200 has a generally rectangular-shaped footprint with a length extending lengthwise along the fuel tank 210 and a width extending laterally along a width of the fuel tank. Although the water storage container 200 shown is generally rectangular in plan, in other embodiments, the water storage container can be square, circular, triangular, or other desirable shape.

Figure 5:
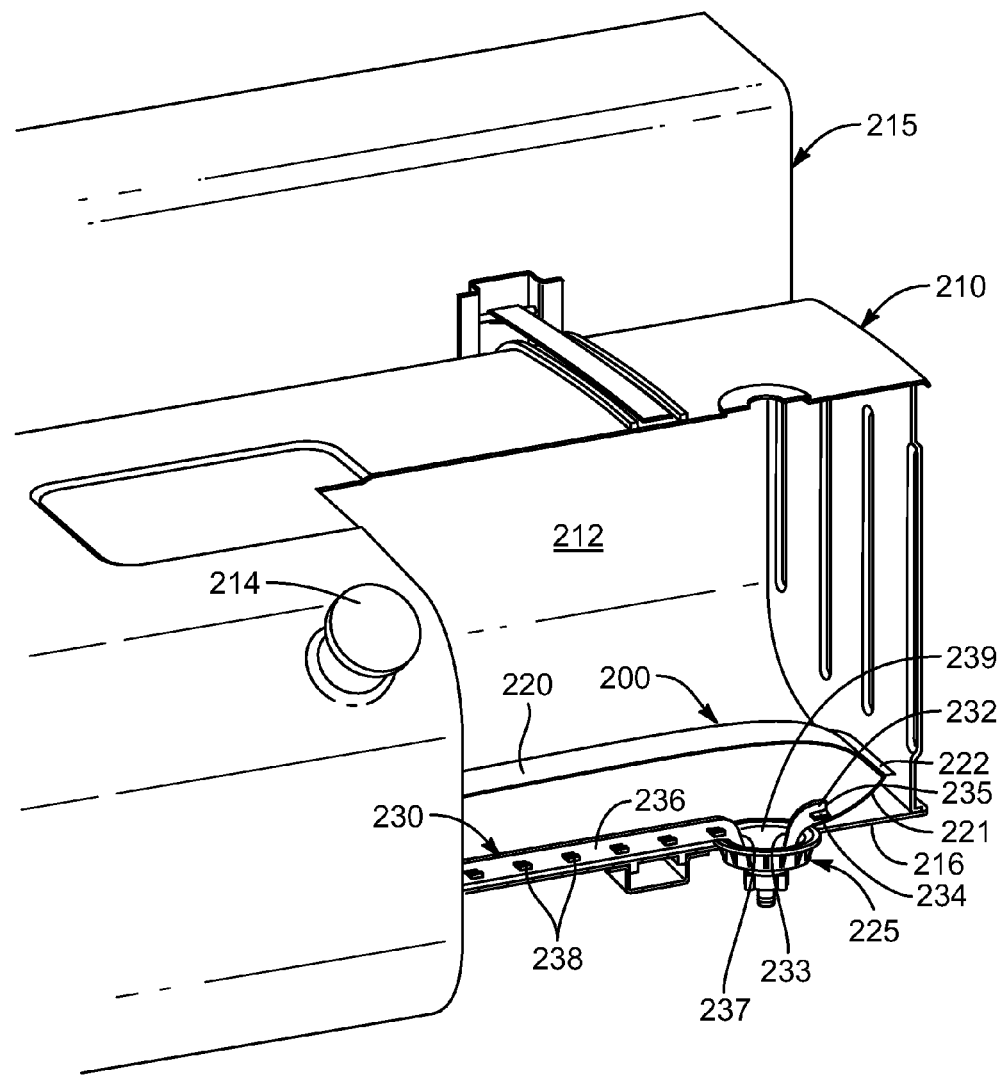
FIG. 5 is a cross-sectional perspective view of the water storage container of FIG. 4.

Referring to FIGS. 4 and 5, the water storage container 200 includes a top wall 220 coupled to a bottom wall 221 along a peripheral edge 222 of the water storage container. At least one of the top and bottom walls 220, 221 is flexible such that the top and bottom walls cooperatively form a compressible flexible bladder. In some embodiments, at least one of the top and bottom walls 220, 221 is stretchable or resiliently flexible such that the top and bottom walls cooperatively form an expandable and contractible bladder. In certain implementations, each of the top and bottom walls 220, 221 includes a sheet of flexible material, such as rubber and/or Kevlar®. The top and bottom walls 220, 221 can be sealed together, such as via an adhesive or laminate, to form the peripheral edge 222. The water storage container 200 is secured to the fuel tank 210 via an at least partially rigid drainage assembly 225. For a resiliently flexible bladder, the walls 220, 221 are expandable as water is added to the water storage container 200 and contractible as water is drained from the water storage container 200. Alternatively, for a non-stretchable flexible bladder, the walls 220, 221 are deformable as water is added and drained from the water storage container 200. Similarly, the water storage container 200 can be either stretchable, contractible, or deformable as any ice within the water storage container melts or as water within the water storage container freezes Referring to FIG. 5, the fluid storage device may optionally include a spacer 230 within the water storage container 200 and coupled to the water drainage assembly 225. The spacer 230 is configured to separate the top wall 220 and bottom wall 221 in the at least partial absence of water in the water storage container 200 to prevent the tank from collapsing upon itself after water has been vacated from the water storage container 200. In other words, the spacer 230 ensures a space of a desired size is maintained between the top and bottom walls 220, 221. The water storage container 200 is generally horizontally oriented within the fuel tank 210 such that the spacer 230 prevents the water storage container from collapsing vertically upon itself. However, with water storage containers in other orientations, such as vertically or diagonally, the spacer would be configured to prevent the water storage container from collapsing horizontally (e.g., laterally) or diagonally upon itself.

The spacer 230 includes first and second spacer members 232, 236. Each spacer member 232, 236 includes an at least partially rigid length of material having a height extending transversely away from the bottom wall 221 toward the top wall 220. The first and second spacer members 232, 236 are coupled to the drainage assembly 225 at a first end 233, 237, respectively, extend away from the assembly in substantially opposite direction, and terminate at a second end 235, 239, respectively (see FIGS. 7 and 8). As shown, the first ends 233, 237 of the first and second members 232, 236 are spaced apart such that water can flow relatively unobstructively into the drainage assembly 225. The first and second spacer members 232, 236 also include extenders or arms 234, 238 that extend substantially transversely away from the spacer members. In some instances, the free end of the arms 238 are upwardly curved (see FIG. 8). The arms 234, 238 are configured to increase the reach of the spacer members 232, 236 such that the spacer members contact a larger portion or area of the top and bottom walls 220, 221 to reduce the risk of collapsing. Accordingly, the arms 234, 238 can have any of various desired lengths depending on any of various factors, such as the size of the water storage container 200, the flexibility and weight of the top and bottom walls 220, 221, and the amount of water remaining in the water storage container after a water draining event.

Figure 6:
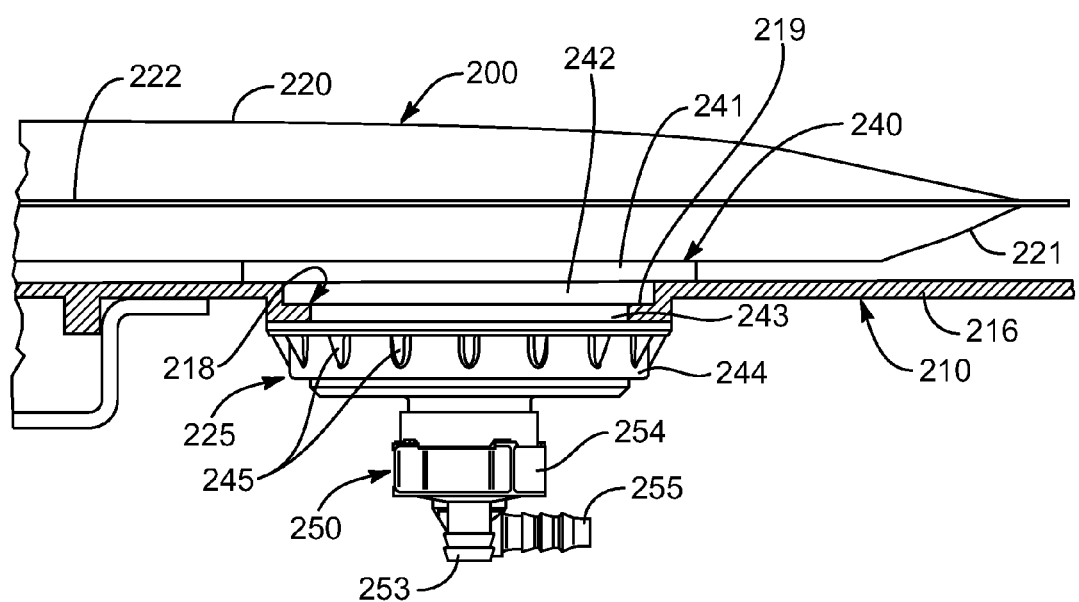
FIG. 6 is an elevational side view of the water storage container of FIG. 4 showing a water drainage assembly of the water storage container in more detail.
Figure 7:
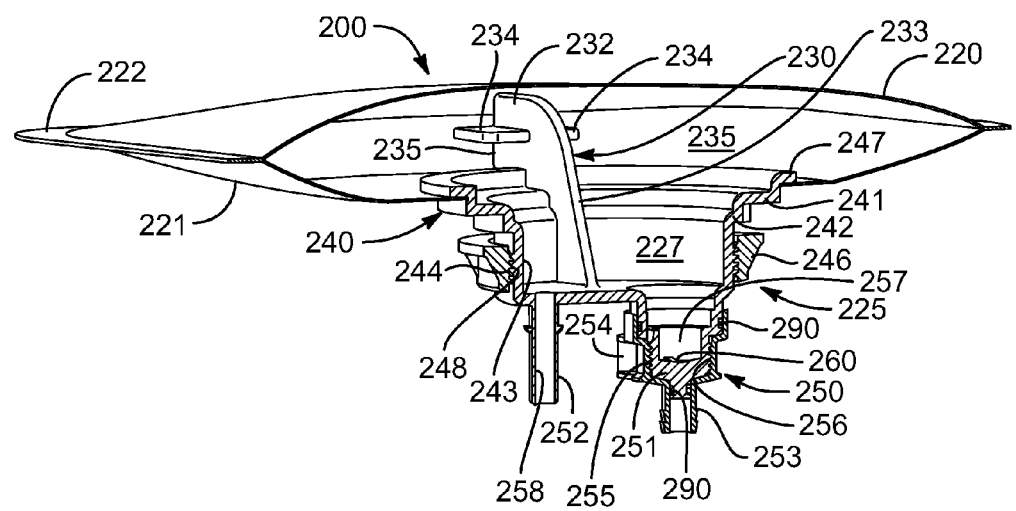
FIG. 7 is a cross-sectional perspective view of the water storage container of FIG. 4 showing a water drainage assembly of the water storage container in more detail.
Figure 8:
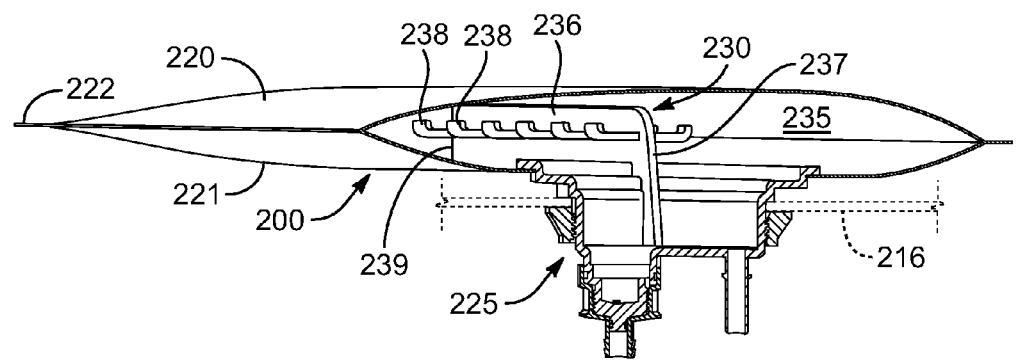
FIG. 8 is a cross-sectional perspective view of the water storage container of FIG. 4 showing a spacer of the water storage container in more detail.
Figure 9:
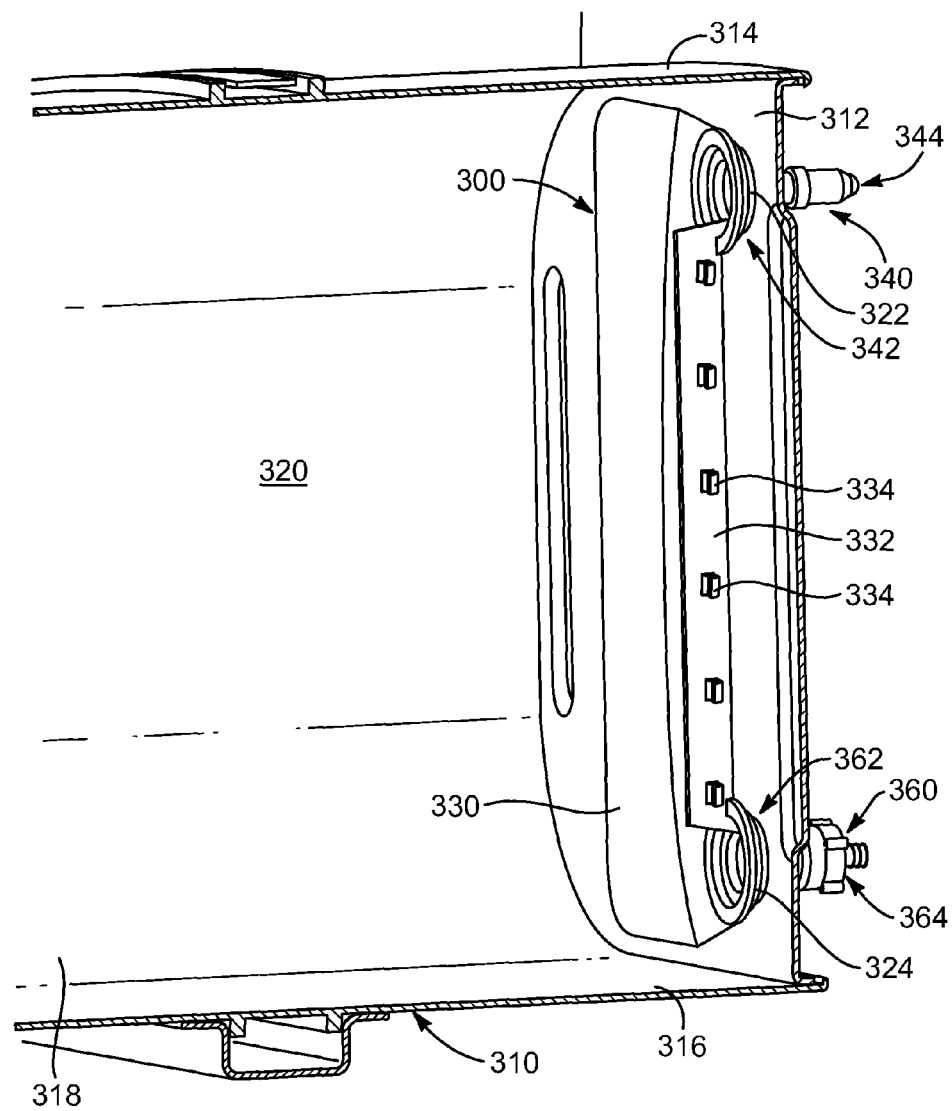
FIG. 9 is a cross-sectional perspective view of a water storage container within a fuel tank according to another embodiment shown with a portion of the fuel tank removed.

Referring to FIG. 6, the water drainage assembly 225 includes a water port portion 240 and a tightening portion or nut portion 246. The water port portion 240 includes first and second rims 241, 242 configured to arrangeably engage a stepped aperture 218 formed in the bottom wall 216 of the fuel tank 210. In a preferred implementation, the first and second rims 241, 242 are matingly engageable. More specifically, the first rim 241 rests on an interior surface of the bottom wall 216 and the second rim 242 rests on a ledge 219 defined by the stepped aperture. The water port portion 240 further includes a bolt portion 243 that extends from the rim 42 and positionable to extend through the aperture 218. The bolt portion 243 defines external threads 244 configured to threadably engage internal threads 248 formed in the tightening portion 246 (see FIG. 7). Again referring to FIG. 7, the water portion 240 includes a third rim 247 positionable within an interior space 235 of the water storage container 200 defined between the top and bottom walls 220, 221. The third rim 247 is secured to the bottom wall 221 via any of various attachment techniques, such as via an adhesive, fastening devices, and embedding processes. In some implementations, an embedding process can include heating the contact surfaces of the flexible material and the third rim 247 such that the flexible material and the third rim bond to each other. The first, second, and third rims 241, 241, 247, as well as water port portion 240, define a water staging area 227 exposed to the interior space 235.

Generally, the tightening portion 244 is an annular-shaped ring defining an aperture through which the bolt portion 243 is extendable. The water drainage assembly 225 is secured to the fuel tank 210 by extending the bolt portion 243 through the aperture 218, threadably engaging the internal threads 248 of the tightening portion 246 with the external threads 244 of the bolt portion 243, and tightening the tightening portion against an exterior surface of the bottom wall 216. In certain implementations, the tightening portion 244 can include a plurality of tabs 245 positioned about a periphery of the tightening portion to facilitate gripping and tightening of the tightening portion against the bottom wall 216.

The drainage assembly 225 also includes a water outlet port 250 and inlet port 252 extending from the bolt portion 243. The water outlet and inlet ports 250, 252 each define a respective water flow channel 257, 258 exposed to the water staging area 227. The water outlet port 250 is in fluid communication with a water drainage line, such as water drain line 134, exposed to the environment 150 and facilitates water flow from the interior space 235 into the environment. The water inlet port 252 is in fluid communication with a water supply line, such as water supply line 132, coupled to a FWS, such as FWS 120 and facilitates water flow from the FWS into the interior space 235.

The water outlet port 250 includes external threads 255 configured to threadably engage internal threads 256 formed in a water outlet hose adaptor or fitting 253. The water outlet hose adaptor 253 includes a tightening portion 254 configured to facilitate tightening and loosening of the adaptor onto and off of the water outlet port 250. Further, the water outlet hose adaptor 253 includes one or more teeth for removably securing a water drainage hose, such as water drain line 134. The water outlet port 250 can include one or more sealing members, such as O-rings 290, configured to sealingly engage an interior surface of the water outlet hose adaptor 253 to prevent water from leaking through the interface between the water outlet port and the adaptor. The shape and size of the water outlet hose adaptor 253 can be selected to correspond with a desired water drainage hose configuration.

The water outlet port 250 includes a water flow regulating device 260. Preferably, the device 260 is a valving or flow regulating device operable between a closed position preventing fluid flow through the outlet port 250 and an open position allowing fluid flow through the outlet port, such as during a water draining event. The device 260 can be automatically or manually controlled to open and close.

In some embodiments, the device 260 is a passive pressure relief valve configured to open automatically in response to a pressure against the valve exceeding a threshold. For example, the device 260 can be a pressure relief valve that opens when fuel in the fuel tank reaches a predetermined pressure amount corresponding or in association with the pressure threshold. The pressure relief valve can be any of various pressure relief valves known in the art.

Figure 13:
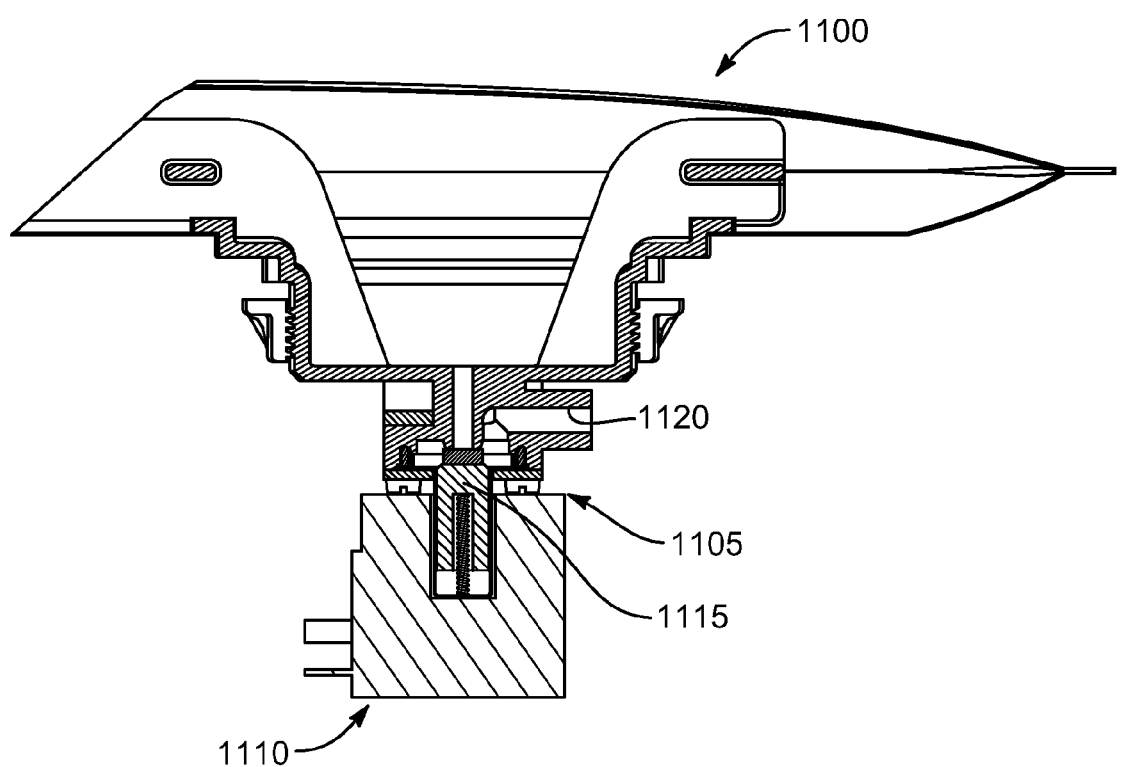
FIG. 13 is a cross-sectional elevational side view of another embodiment of a water storage container with an electronically controlled flow regulation device.

In other embodiments, the water flow regulating device is an electronically controlled valve coupled to one or more pressure sensors in pressure sensing communication, or fluid level sensors in fluid level sensing communication, with fuel in the fuel tank 210, or in some instances, water in the water storage container 200. In some implementations, the electronically controlled valve is coupled to the pressure sensor or fluid level sensor via an electronic control module (not shown). The electronic control module can be configured to command the electronically controlled valve to open, such as via activation of a solenoid, when the pressure of the fuel sensed by the pressure sensor exceeds the threshold. For example, referring to FIG. 13, fluid tank 1100 includes a water outlet port 1105 with an electronically controlled water regulating device 1110. The device 1110 includes a solenoid valve 1115 selectively controllable to close to prevent fluid in the tank 1100 from exiting a fluid outlet 1120 and to open to allow fluid to exit the tank through the fluid outlet. Although not shown, the fluid flow regulator can include a hydraulically-activated valve.

In yet another embodiment, the device 260 is a manually controlled valve that is manually actuated to open and close the valve. The manually controlled valve can be opened by a user when prompted by a water level indicator (not shown), prior to a refueling event, after a desired period of time has elapsed since a previous water draining event, or some other indicator. The manually controlled valve can be a removable cap forming a seal with the water outlet port 250 when in the closed position. The cap can be loosened from the water outlet port 250 to break the seal and allow water to drain from the outlet port.

Regardless of the type of water flow regulating device used, once the pressure in the fuel tank 210 meets the pressure threshold and the device is opened, the hydrostatic pressure of the fuel in the fuel tank forces the water to drain from the water storage container via the water outlet hose adaptor 253.

The water inlet port 252 includes an elongate cylindrical tube configured to receive a water inlet hose adaptor or fitting 255 (see FIG. 6). The water inlet hose adaptor 255 includes one or more teeth or barbs for removably securing a water supply hose. In the illustrated embodiment, the water inlet hose adaptor 255 is an L-shaped adaptor configured to receive the water supply hose in a horizontal orientation.

The water storage container 200 of FIGS. 4-8 is shown mounted to the bottom wall 216 of the fuel tank 210 toward a back of the fuel tank 210 in a horizontal orientation. In other embodiments, the water storage container 200 can be mounted to the bottom wall, or even top wall, in a horizontal orientation at any of various locations along the length of the fuel tank 210. In other embodiments, however, the water storage container 200 and other water storage container embodiments described herein can be mounted to any of various portions of the fuel tank in any of various orientations. For example, referring to FIG. 9, a water storage container 300 is shown mounted to a back wall 312 of a fuel tank 310 in a vertical orientation, i.e., extending lengthwise along a height of the fuel tank.

The water storage container 300 is similar to water storage container 200. The water storage container 300 is positioned within an interior cavity 312 of the fuel tank 310 defined between the back wall 312, a top wall 314, a bottom wall 316, two side walls 318, and a front wall (not shown). Further, the water storage container 300 includes a flexible bladder 330, which in some embodiments, is an expandable and contractible bladder 330, coupled to a water inlet port 342 and a water outlet port 362.

The water storage container 300 is unique from water storage container 200 in several ways. For example, the water drainage assembly coupled to the water storage container 300 includes two separate fluid directing assemblies, i.e., a fluid intake assembly 340 and a fluid drainage assembly 360, extending through respective apertures in the fuel tank 310. Each assembly 340, 360 includes a water port portion 322, 324, respectively, and a tightening portion (not shown). The tightening portions can be threadably engageable with a respective water port portion 322, 324 in the same manner as the water port portion 240 and tightening portion 346 of water storage container 200 to secure the assemblies 340, 360 to the back wall 312. The fluid intake assembly 340 includes the water inlet port 342 and the drainage assembly 360 includes the water outlet port 362. The water inlet port portion 322 is configured to receive a water inlet hose adaptor 344 and the water outlet port portion 324 is configured to receive a water outlet hose adaptor 364. The water outlet port portion 324 includes a water flow regulation device, e.g., device 260, to prevent fluid flow up to a threshold hydrostatic pressure and allow fluid flow above the threshold hydrostatic pressure. As further shown in FIG. 9, a spacer 332 is positioned within the water storage container 300 and is coupled to and extends vertically between the assemblies 340, 360. The spacer 332 includes a plurality of extenders or arms 334 similar to arms 234.

Although the water storage container 300 is shown mounted to the back wall of a fuel tank, in other embodiments, the water storage container 300 can be mounted to the front wall or either of two side walls of the fuel tank in a similar manner.

Figure 10:
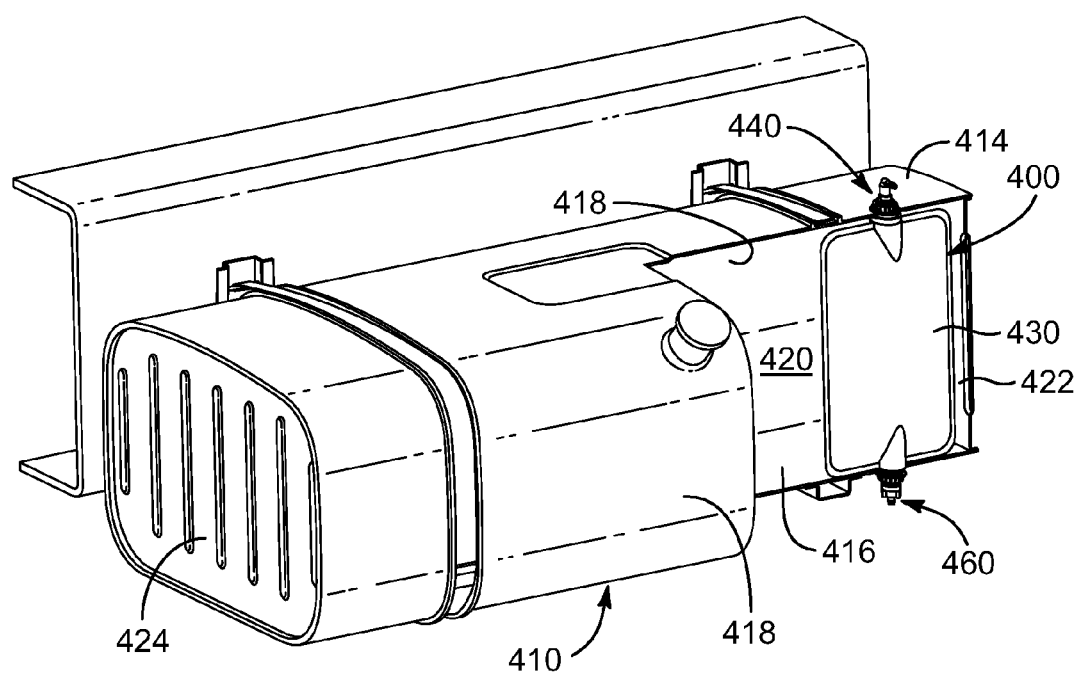
FIG. 10 is a perspective view of yet another embodiment of a water storage container within a fuel tank shown with a portion of the fuel tank removed.
Figure 11:
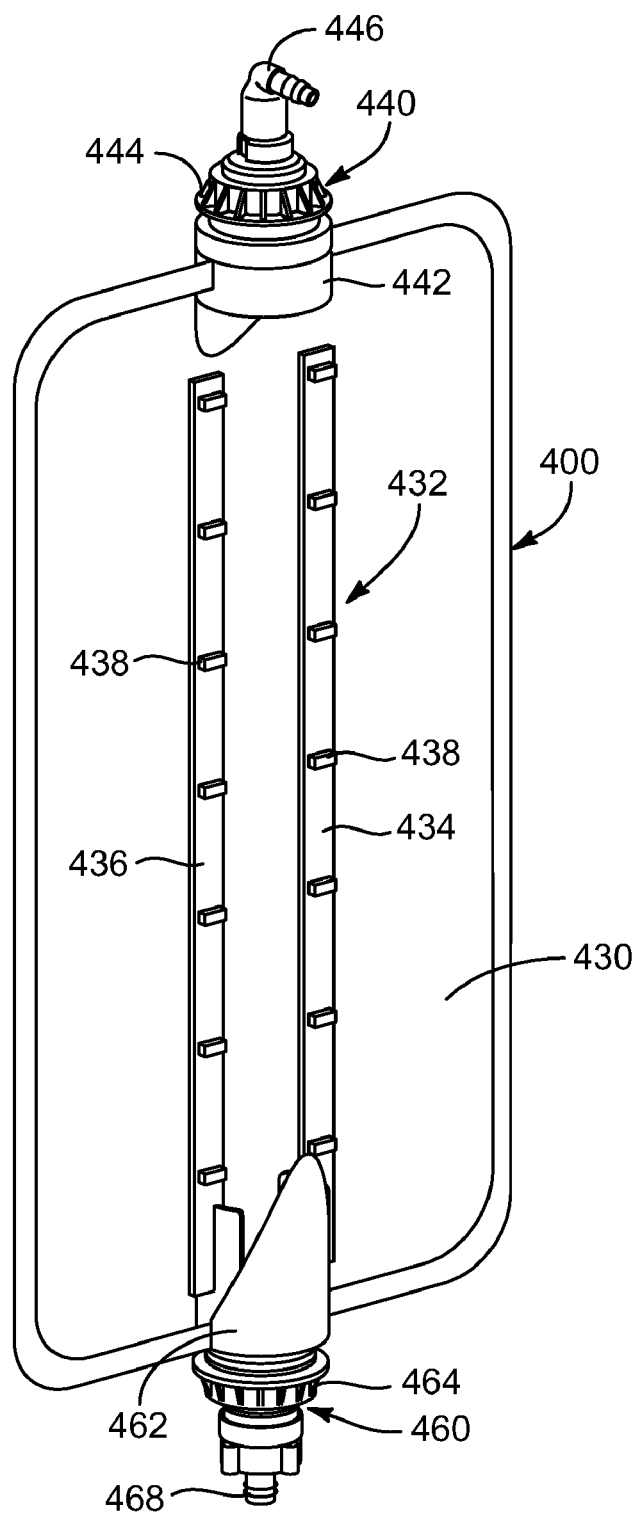
FIG. 11 is a partial cross-sectional perspective view of the water storage container of FIG. 10.

Referring now to FIGS. 10 and 11, a water storage container 400 is shown mounted to top and bottom walls 414, 416 of a fuel tank 410 in a vertical orientation. The water storage container 400 is positioned within an interior cavity 420 of the fuel tank 410 defined between the top wall 414, the bottom wall 416, two side walls 418, a back wall 422, and a front wall 424. Although the water storage container 400 is shown positioned at an approximate center of the fuel tank 410 toward the back of the tank, in other embodiments, the water storage container can be positioned at any of various locations within the tank while maintaining the vertical orientation. The water storage container 400 also includes a flexible bladder 430 coupled to a water inlet intake assembly 440 and water outlet drainage assembly 460 extending through respective apertures in the fuel tank 410. The water inlet intake assembly 440 includes a water inlet hose adaptor 446 and a tightening portion 444 configured to secure the water inlet intake assembly to the fuel tank 410 in a manner similar to that described above in relation to drainage assembly 225. Similarly, the water outlet drainage assembly 460 includes a water outlet hose adaptor 468 and a tightening portion 464 configured to secure the water outlet drainage assembly to the fuel tank 410. Further, although not shown, the water outlet drainage assembly 460 includes a fluid flow regulating device similar to device 260 discussed above.

As shown in FIG. 11, each assembly 440, 460 includes a respective water staging portion 442, 462. Before entering the bladder 460, water flows through the staging portion 442, and before exiting the bladder, water flows through the staging portion 462. The water storage container 400 includes a spacer 432 having two spacer members 434, 436 coupled to at least one of the staging portions 442, 462 and extending lengthwise along a length of the bladder 460. In the illustrated embodiment, the spacer members 434, 436 are secured to the staging portion 462 and run parallel to each other in a spaced-apart manner toward the staging portion 442. Each spacer member 434, 436 includes a plurality of extenders or arms 438. The spacer members 434, 436 are configured to prevent a collapse of the bladder 430 between assemblies 440, 460.

In addition to the above-discussed spacers, the spacers described herein can have any of various other shapes and sizes configured to prevent a collapse of the bladder when substantially empty.

For example, FIG. 12A shows a spacer 530 coupled to a water outlet drainage assembly 540. The spacer 530 includes two elongate spacer members 534, 536 secured to the water outlet drainage assembly 540 at one end and extending toward a second end at an angle relative to each other. In other words, the minimum distance between the spacer members 534, 536 increases in a direction extending away from the water outlet drainage assembly 530. The spacer members 534, 536 each include a plurality of arms or extenders 534 that extend transversely away from the members.

FIG. 12B shows a spacer 630 coupled to a water outlet drainage assembly 640. The spacer 630 includes a single spacer member 634 having a helical or spiral configuration. In other words, the spacer member 634 winds around a central axis of the water outlet drainage assembly 640 in a direction extending away from the water outlet drainage assembly 530.

FIG. 12C shows a spacer 730 coupled to a water outlet drainage assembly 740. The spacer 730 includes four arcuate or curved spacer members 734. The arcuate spacer members 734 are secured to the water outlet drainage assembly 740 at a first end, curve outward away from each other for a given distance away from the drainage assembly, curve inward toward each other thereafter, and terminate at second ends. In some instances, the second ends are secured to a water inlet intake assembly opposing the water outlet drainage assembly 740. Although four arcuate spacer members 734 are shown, in other embodiments, the spacer can have less than four (e.g., one) or more than four arcuate spacer members.

FIG. 12D shows a spacer 830 coupled to a water outlet drainage assembly 840. The spacer 830 includes a single linear spacer member 834 and multiple arcuate shaped spacer members 836 coupled to the linear spacer member. The linear spacer member 834 extends in a first direction, e.g., vertical direction, and the spacer members 836 extend in a second direction substantially perpendicular to the first direction, e.g., horizontal direction. Although arcuate spacer members 836 having spaced-apart free ends are shown, in some embodiments, the spacer members 836 have a circular, annular, triangular, rectangular, ovular, or other desirable shape in cross-section. Further, although three spacer members 836 are shown, more or less than three members can be used without deviation from the present invention.

FIG. 12E shows a spacer 930 coupled to a water outlet drainage assembly 940. The spacer 930 includes a mesh tube 934 defining an interior channel. The mesh tube 934 can be made from a curved mesh sheet with adjoining ends. Alternatively, the mesh tube 934 can form a substantially "C" shape, triangular shape, rectangle shape, oval shape, or other shape in cross-section.

FIG. 12F shows a spacer 730 coupled to a water outlet drainage assembly 740. The spacer 730 includes a spacer member 1034 having a first portion 1050 secured to the water outlet drainage assembly 740, a second portion 1052 angled with respect to the first portion, and a third portion 1054 extending at an angle relative to the second portion. In certain instances, the first portion 1050 is linear, the second portion 1052 is linear and extends transversely from the first portion 1050, and the third portion 1054 is linear and extends transversely from the second portion and parallel to the first portion. The spacer member 1034 includes a plurality of extenders or arms 1038 extending from the spacer member.

Based on the foregoing and/or the knowledge of one of ordinary skill in the art in view of this disclosure, embodiments of a separated water containment and drainage system are described herein that provide at least one of the following advantages: (1) storing water in the fuel tank without contaminating the fuel; (2) utilizing fuel pressure to eject water from the fuel system; (3) saving space by placing water storage container in fuel tank; (4) using a spacer to prevent collapse of the water storage container as water is drained from the tank; (5) decontaminating separated water prior to disposing of the water either before or after the water storage container; (6) providing a variable volume and flexible water storage container; (7) resisting water storage container volumetric change stresses associated with freezing water; and (8) increasing water storage capacity of the system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fluid storage device for storing a first fluid in a second fluid storage container fillable with a second fluid, comprising:
   a first fluid storage container positionable within the second fluid storage container, the first fluid storage container being flexible;
   a first fluid inlet coupled to the first fluid storage container, the inlet being communicable in fluid receiving communication with a first fluid source;
   a structural element positioned within said first fluid storage container that prevents collapse of the first fluid storage container; and
   a first fluid outlet coupled to the first fluid storage container;
   wherein the first fluid in the first fluid storage container is caused to drain from the first fluid outlet upon the occurrence of one or more of:
      the first fluid storage container filling with the first fluid to a predetermined level;
      the first fluid storage container having a pressure less than a pressure of the second fluid storage container;
      the first fluid storage container pressure achieving a predetermined threshold;
      the second fluid storage container pressure achieving a predetermined threshold;
      the second fluid storage container filling with the second fluid;
      the first fluid outlet being opened for first fluid egress; and
      the first fluid storage container pressure being greater than a pressure in the first fluid outlet,
   wherein a separator having a fuel inlet communicates with said second fluid storage container and an outlet communicates with said first fluid storage container, and
   wherein the second fluid storage container is incorporated within a fuel system supply of an internal combustion engine.

2. The fluid storage device of claim 1, further comprising a fluid flow regulator coupled to the first fluid outlet of the first fluid storage container, wherein the fluid flow regulator opens to allow the first fluid contained within the first fluid storage container to drain from the first fluid storage container through the first fluid outlet in response to a pressure within the second fluid storage container reaching a predetermined pressure threshold.

3. The fluid storage device of claim 1, further comprising a water drainage assembly coupled to the first fluid storage container and securable to the second fluid storage device, the first fluid inlet and outlet being coupled to the water drainage assembly.

4. The fluid storage device of claim 1, further comprising a first fluid intake assembly and a first fluid drainage assembly spaced-apart from the first fluid intake assembly, the first fluid intake assembly and the first fluid drainage assembly being coupled to the first fluid storage container and securable to the second fluid storage container, wherein the first fluid inlet being coupled to the first fluid intake assembly and the first fluid outlet being coupled to the first fluid drainage assembly.

5. The fluid storage device of claim 1, wherein the first fluid storage container comprises an expandable bladder.

6. The fluid storage device of claim 1, wherein the first fluid storage container comprises at least one flexible bellows.

7. The fluid storage device of claim 1, wherein the first fluid storage container comprises two opposing walls, the fluid storage device further comprising a wall spacer positioned within the first fluid storage container between the opposing walls.

8. The fluid storage device of claim 7, wherein the wall spacer comprises a wall spacer selected from the group consisting of a wall spacer comprising at least one elongate at least partially rigid member, a wall spacer comprising at least one elongate at least partially rigid member comprising a plurality of arms extending away from the rigid member, a wall spacer comprising at least two elongate at least partially rigid members extending parallel to each other, a wall spacer comprising at least two elongate at least partially rigid members extending at an angle relative to each other, a wall spacer comprising at least one elongate at least partially rigid and substantially arcuate member, a wall spacer comprising at least one elongate at least partially rigid and substantially helical member, and a wall spacer comprising a meshed portion.

9. The fluid storage device of claim 1, wherein the fluid flow regulator comprises a valve selected from the group consisting of a pressure relief valve, a manually operated fluid valve, a hydraulically activated valve, and an electronically controlled fluid valve.

10. A water containment and removal system for an internal combustion engine powered by a fuel, comprising:

a fuel tank fillable with fuel, the fuel tank being communicable in fuel supplying communication with the internal combustion engine via a fuel supply line;

a fuel-water separator coupled to the fuel supply line, the fuel-water separator being configured to separate water from fuel in the fuel supply line;

a water storage container positioned within the fuel tank, the water storage container being communicable in water receiving communication with the fuel-water separator via a water supply line;

a water drainage line coupled to the water storage container; and a structural element positioned within said water storage container that prevents collapse of the water storage container, wherein the water storage container is flexible and water in the water storage container can be caused to drain from the water storage container into the water drainage line by contraction of said water storage container.

11. The system of claim 10, wherein water in the water storage container is caused to drain from the water storage container into the water drainage line upon the occurrence of at least one of:

the water storage container filling with water to a predetermined level;

the water storage container having a pressure less than a pressure of the fuel tank;

the water storage container pressure achieving a predetermined threshold;

the fuel tank pressure achieving a predetermined threshold; and the fuel tank filling with fuel.

12. The system of claim 11, wherein the water drainage line comprises a fluid flow valve configured to open to allow water to drain from the water storage container, and wherein water in the water storage container is caused to drain from the water storage container into the water drainage line upon the occurrence of at least one of:

the fluid flow valve opening for water egress; and the water storage container having a pressure greater than a pressure in the fluid flow valve.

13. The system of claim 10, further comprising a water backflow regulator coupled to the water supply line between the fuel-water separator and the water storage container.

14. The system of claim 10, further comprising a fluid flow regulating valve coupled to the water drainage line.

15. The system of claim 10, further comprising a hydrocarbon removal device coupled to the water drainage line.

16. The system of claim 10, wherein the water storage container is horizontally oriented within the fuel tank.

17. The system of claim 10, wherein the water storage container is vertically oriented within the fuel tank.

18. A fluid storage device for storing a first fluid in a second fluid storage container fillable with a second fluid, comprising:

a first fluid storage container having a volume defined by one or more flexible walls sealed and arranged within the second fluid storage container, the first fluid storage container being flexible, where at least one of the one or more flexible walls is compressively responsive to pressure exerted on the at least one of the one or more flexible walls by the second fluid, and where at least one of the one or more flexible walls is tensionably expansive to pressure exerted on the at least one of the one or more flexible walls by the first fluid;

a first fluid inlet coupled to the first fluid storage container, the inlet being communicable in fluid receiving communication with a first fluid source;

a structural element positioned within said first fluid storage container that prevents collapse of the first fluid storage container; and a first fluid outlet coupled to the first fluid storage container;

wherein the second fluid is fuel, the second fluid storage container is a fuel tank being capable of being communicable in fuel supplying communication with an internal combustion engine via a fuel supply line, wherein a separator is coupled to the fuel supply line, the separator being configured to separate the first fluid from fuel in the fuel supply line, wherein the first fluid storage container is communicable in receiving communication with the separator via a supply line, wherein a drainage line is coupled to the first fluid storage container, and wherein the first fluid in the first fluid storage container is caused to drain from the first fluid outlet upon the occurrence of one or more of:

the first fluid storage container filling with the first fluid to a predetermined level, the first fluid storage container having a pressure less than a pressure of the second fluid storage container, the first fluid storage container pressure achieving a predetermined threshold, the second fluid storage container pressure achieving a predetermined threshold, the second fluid storage container filling with the second fluid, the first fluid outlet being opened for first fluid egress, and the first fluid storage container having a pressure greater than pressure in the first fluid outlet.

19. The fluid storage device of claim 18, further comprising a fluid flow regulator coupled to the first fluid outlet of the first fluid storage container, wherein the fluid flow regulator opens to allow the first fluid contained within the first fluid storage container to drain from the first fluid storage container through the first fluid outlet in response to a pressure within the second fluid storage container reaching a predetermined pressure threshold.

20. The fluid storage device of claim 18, further comprising a water drainage assembly coupled to the first fluid storage container and securable to the storage device, the first fluid inlet and outlet being coupled to the water drainage assembly.

21. The fluid storage device of claim 18, further comprising a first fluid intake assembly and a first fluid drainage assembly spaced-apart from the first fluid intake assembly, the first fluid intake assembly and the first fluid drainage assembly being coupled to the first fluid storage container and securable to the second fluid storage container, wherein the first fluid inlet being coupled to the first fluid intake assembly and the first fluid outlet being coupled to the first fluid drainage assembly.

22. The fluid storage device of claim 18, wherein the separator is a fuel-water separator configured to separate water from fuel in the fuel supply line;

wherein the first fluid storage container is a water storage container communicable in water receiving communication with the fuel-water separator via the supply line; and wherein the drainage line is a water drainage line.

* * * * *